(12) United States Patent
Liu et al.

(10) Patent No.: US 9,337,689 B2
(45) Date of Patent: May 10, 2016

(54) POWER SUPPLY SYSTEM AND METHOD FOR CONTROLLING THE SAME

(71) Applicant: DELTA ELECTRONICS, INC., Taoyuan Hsien (TW)

(72) Inventors: Hongguang Liu, Taoyuan Hsien (TW); Yaoning Xia, Taoyuan Hsien (TW); Xingguo Wang, Taoyuan Hsien (TW); Kai Dong, Taoyuan Hsien (TW)

(73) Assignee: DELTA ELECTRONICS, INC., Taiwan (CN)

( * ) Notice: Subject to any disclaimer, the term of this patent is extended or adjusted under 35 U.S.C. 154(b) by 459 days.

(21) Appl. No.: 13/844,933

(22) Filed: Mar. 16, 2013

(65) Prior Publication Data
US 2014/0077602 A1    Mar. 20, 2014

(30) Foreign Application Priority Data
Sep. 17, 2012    (CN) .......................... 2012 1 0344492

(51) Int. Cl.
*H02J 9/06* (2006.01)
*H02J 1/10* (2006.01)

(52) U.S. Cl.
CPC . *H02J 9/06* (2013.01); *H02J 1/102* (2013.01); *Y10T 307/615* (2015.04)

(58) Field of Classification Search
CPC .......................................................... H02J 9/06
USPC ............................................................ 307/64
See application file for complete search history.

(56) References Cited

U.S. PATENT DOCUMENTS

| | | | |
|---|---|---|---|
| 7,859,874 B2 * | 12/2010 | Bovitz | H02M 1/10 307/75 |
| 8,582,336 B2 * | 11/2013 | Tanaka | H02M 1/10 307/72 |
| 8,736,107 B1 * | 5/2014 | Frink | G06F 1/263 307/100 |

(Continued)

FOREIGN PATENT DOCUMENTS

| | | |
|---|---|---|
| CN | 102121454 A | 7/2011 |
| CN | 201985619 U | 9/2011 |
| EP | 2498388 A2 | 9/2012 |

OTHER PUBLICATIONS

"First Office Action" issued by the State Intellectual Property office of The People's Republic of China on Mar. 24, 2015, China.

*Primary Examiner* — Jared Fureman
*Assistant Examiner* — Daniel Kessie
(74) *Attorney, Agent, or Firm* — Yunling Ren; Eaton & Van Winkle

(57) ABSTRACT

A power supply system and a method for controlling the same are disclosed. The power supply system includes: a first AC source and a second AC source; a circuit switching module; a controllable AC/DC conversion module electrically coupled to the circuit switching module; a subsequent stage power supply module electrically coupled to the controllable AC/DC conversion module; and a control module electrically coupled to the circuit switching module and the controllable AC/DC conversion module, and when failure occurs in any one of the first AC source and the second AC source, configured to control the circuit switching module to switch to the other one of the first AC source and the second AC source which is in normal operation. By employing the power supply system and the method for controlling the same provided by the present application, the cost may be reduced and the reliability may be increased.

11 Claims, 11 Drawing Sheets

(56) References Cited

U.S. PATENT DOCUMENTS

| | | | | |
|---|---|---|---|---|
| 2009/0257258 A1* | 10/2009 | Ayukawa | ............ | H02M 1/42 363/89 |
| 2009/0278408 A1* | 11/2009 | Cioffi | .............. | H02J 9/061 307/80 |
| 2011/0101898 A1* | 5/2011 | Shinomoto | ............ | H02M 1/126 318/400.3 |
| 2011/0127833 A1* | 6/2011 | Wu | ............................ | G06F 1/26 307/31 |
| 2013/0039101 A1* | 2/2013 | Lu | ............................ | H02H 9/001 363/49 |

\* cited by examiner

POWER SUPPLY SYSTEM AND METHOD FOR CONTROLLING THE SAME

CROSS REFERENCE TO RELATED APPLICATIONS

The present application claims priority under 35 U.S.C. §119 to Chinese Patent Application No. 201210344492.7, filed on Sep. 17, 2012, the entire contents of which are incorporated herein by reference.

TECHNICAL FIELD

The present application relates to power supply technologies, specifically, to a power supply system and a method for controlling the power supply system.

BACKGROUND

Nowadays, with rapid progress in science and technology, more and more electronic apparatuses such as medical devices and servers need electricity supplied by Uninterrupted Power Supplies (UPSs). However, UPSs are usually expensive, and particularly, are not suitable for situations of low power requirements. Thus, it is quite necessary to devise novel, general purpose UPSs with high reliability, high efficiency and low cost.

FIG. 1 depicts a circuit block diagram of a redundant power supply system in conventional technologies. The system includes two Alternating Current (AC) sources 11a and 11b and two Alternating Current to Direct Current (AC/DC) conversion modules 12a and 12b. Output terminals of the two AC/DC conversion modules 12a and 12b are connected in parallel through diodes D1 and D2, thereby supplying electricity to a final load 13. In this power supply system, reliable operations of the load 13 may be guaranteed as long as any one of the input power supplies can supply electricity.

However, this redundant power supply system necessarily has two AC/DC conversion modules 12a and 12b, and the cost of an AC/DC conversion module is relatively higher than other components in a power supply system, and thus the whole cost of the power supply system rises.

Furthermore, each AC/DC conversion module has to be designed based on the maximum power required by the load 13, so as to guarantee that the load 13 may be supplied with the maximum power when only one input is available (e.g., one of the AC sources has a failure such as power off). This involves in more space for the power supply system and causes an increase in the cost of the power supply system.

SUMMARY OF THE INVENTION

Aiming at the problems existing in the conventional technologies, a power supply system and a method for controlling the power supply system are provided by the present application, in order to lower the cost of the power supply system and to reduce the space required.

In one aspect, the present application provides a power supply system, which includes:
a first AC source and a second AC source;
a circuit switching module;
a controllable AC/DC conversion module electrically coupled to the circuit switching module and configured to convert AC output from the circuit switching module into DC;
a subsequent stage power supply module electrically coupled to the controllable AC/DC conversion module and configured to convert the DC output from the controllable AC/DC conversion module into an electrical signal required by a load;
a control module electrically coupled to the circuit switching module and the controllable AC/DC conversion module and configured to receive operation state signals of the first AC source and the second AC source, and when failure occurs in any one of the first AC source and the second AC source, to control the circuit switching module to switch to the other one of the first AC source and the second AC source which is in normal operation.

In another aspect, the present application provides a method for controlling a power supply system. The power supply system includes a first AC source, a second AC source, a control module, a circuit switching module and a subsequent stage power supply module. The method for controlling includes:
receiving operation state signals of the first AC source and the second AC source, and when failure occurs in any one of the first AC source and the second AC source, controlling the circuit switching module to switch to the other one of the first AC source and the second AC source which is in normal operation.

In the power supply system and the method for controlling the same provided by the present application, an UPS system is realized by using one circuit switching module, one control module and one controllable AC/DC conversion module. Compared with the conventional technologies, since only one controllable AC/DC conversion module is needed in this power supply system, the number of required AC/DC conversion modules is reduced, resulting in a reduction in cost and required space. Although one circuit switching module and one control module are added as compared with the conventional technologies, the power supply system of the present application still has a lower cost, a higher power density and a smaller power consumption in whole since the costs, required spaces and power consumptions of the circuit switching module and the control module are relatively small than those of an AC/DC conversion module.

The disclosure and claimed scope of the present application will become well understood from the following description of embodiments of the present application with reference to the drawings.

DETAILED DESCRIPTION OF THE EMBODIMENTS

Embodiments of the present application will be described below in detail. It should be noted that the embodiments described herein are for illustration purposes only, but not to limit the present application.

Figure 2:
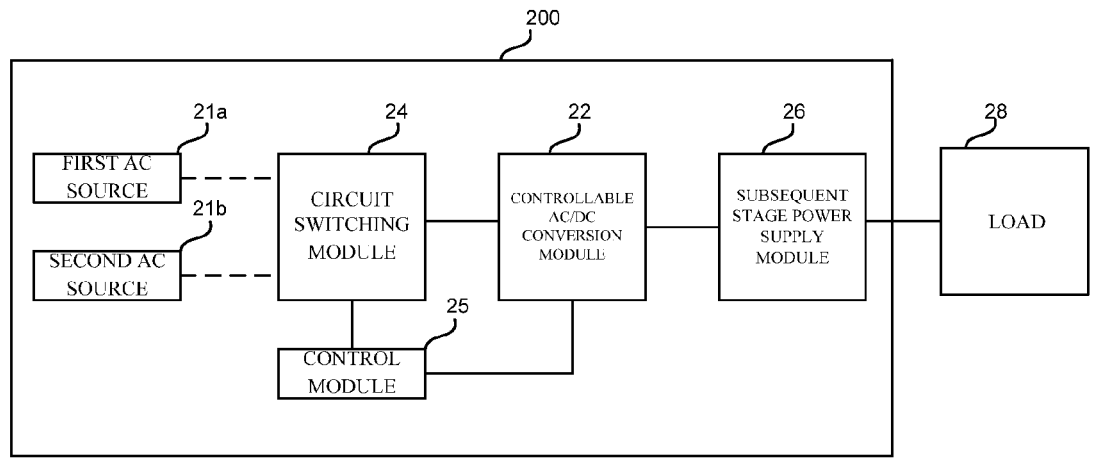
FIG. 2 illustratively depicts a circuit block diagram of a power supply system according to an embodiment of the present application.

FIG. 2 illustratively depicts a circuit block diagram of a power supply system according to an embodiment of the present application. The power supply system 200 includes a first AC source 21a, a second AC source 21b, a circuit switching module 24, a controllable AC/DC conversion module 22, a subsequent stage power supply module 26 and a control module 25.

The controllable AC/DC conversion module 22 is electrically coupled to the circuit switching module 24 and is configured to convert AC output from the circuit switching circuit 24 into DC. The controllable AC/DC conversion module 22 may include various electronic devices which are capable of starting or stopping converting AC into DC under control of the control module 25. For example, the controllable AC/DC conversion module 22 may be realized by thyristors in combination with rectifying devices (e.g., a bridge rectifier).

The subsequent stage power supply module 26 is electrically coupled to the controllable AC/DC conversion module 22 and is configured to generate an electrical signal suitable for a load 28 according to the DC output by the controllable AC/DC conversion module 22.

The control module 25 is electrically coupled to the circuit switching module 24 and the controllable AC/DC conversion module 22, and is configured to receive operation state signals of the first AC source 21a and the second AC source 21b and, when failure occurs in any one of the first AC source 21a and the second AC source 21b (i.e., the control module 25 receives a failure signal of the first AC source 21a and/or the second AC source 21b), to control the circuit switching module 24 to switch to the other one of the first AC source 21a and the second AC source 21b which is in normal operation.

In the embodiments of the present application, that an AC source has a failure may refer to this AC source has a power off, etc. For example, it may be determined whether there is a failure by detecting voltages of the first AC source 21a and the second AC source 21b. It should be pointed out that, other electrical parameters of the first AC source 21a and the second AC source 21b may also be detected to determine whether there is a failure. Methods and apparatus regarding the detection of whether the first AC source 21a and the second AC source 21b have a failure may be conventional technologies, and detailed descriptions thereof will be omitted herein. Although not explicitly shown in FIG. 2, one of ordinary skill in this art may understand that, between the control module 25 and the AC sources 21a and 21b, there may be direct or indirect electrical coupling relationships corresponding to the employed detection method.

Figure 1:
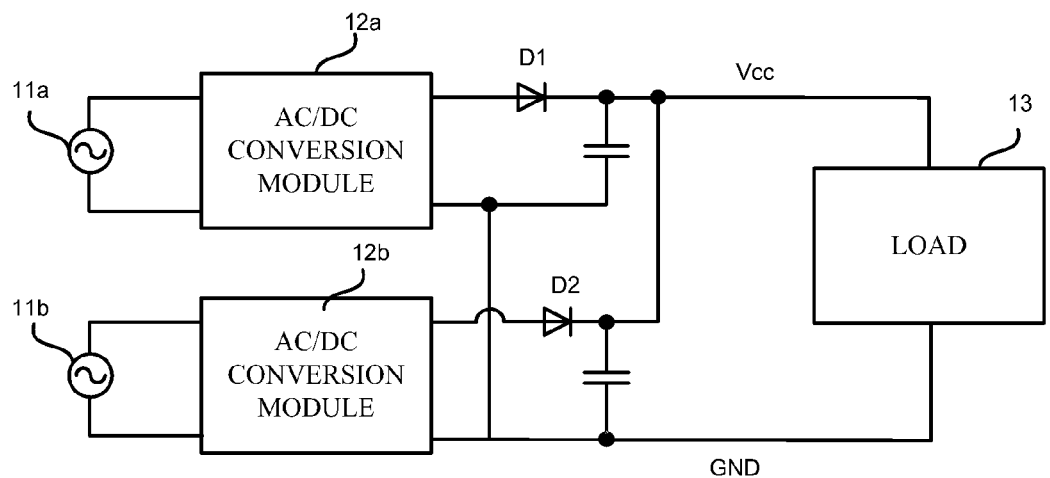
FIG. 1 depicts a circuit block diagram of a redundant power supply system in conventional technologies.

As compared with the power supply system depicted in FIG. 1, one notable distinction of the power supply system depicted in FIG. 2 is: two AC/DC conversion modules are needed in FIG. 1, while only one controllable AC/DC conversion module is needed in FIG. 2.

In a power supply system, an AC/DC conversion module has relatively higher cost and higher power consumption and occupies more space. In the power supply system depicted in FIG. 2, by replacing the two AC/DC conversion modules in the conventional technologies with one circuit switching module, one control module and one controllable AC/DC conversion module, the number of the employed AC/DC conversion module is reduced. Thus, as compared with the power supply system of the conventional technologies depicted in FIG. 1, the power supply system depicted in FIG. 2 has a lower cost. Furthermore, because of a reduction in volume, the power supply system depicted in FIG. 2 needs less space and thus the power density is increased. In addition, the power consumption is decreased.

Although one circuit switching module and one control module are added as compared with the conventional technologies, the power supply system of the present application still has a lower cost and a lower power consumption in whole since the costs and power consumptions of the circuit switching module and the control module are relatively smaller than that of an AC/DC conversion module.

In the power supply system depicted in FIG. 2, the controllable AC/DC conversion module 22 may be controlled by the control module 25. When failure occurs in any one of the first AC source 21a and the second AC source 21b, the control module 25 may firstly cut off a control signal for the controllable AC/DC conversion module 22, then control the circuit switching module 24 to switch to the other one of the first AC source 21a and the second AC source 21b which is in normal operation, and then enable the control signal for the controllable AC/DC conversion module 22. In this way, a relatively reliable switching may be realized.

Figure 3:
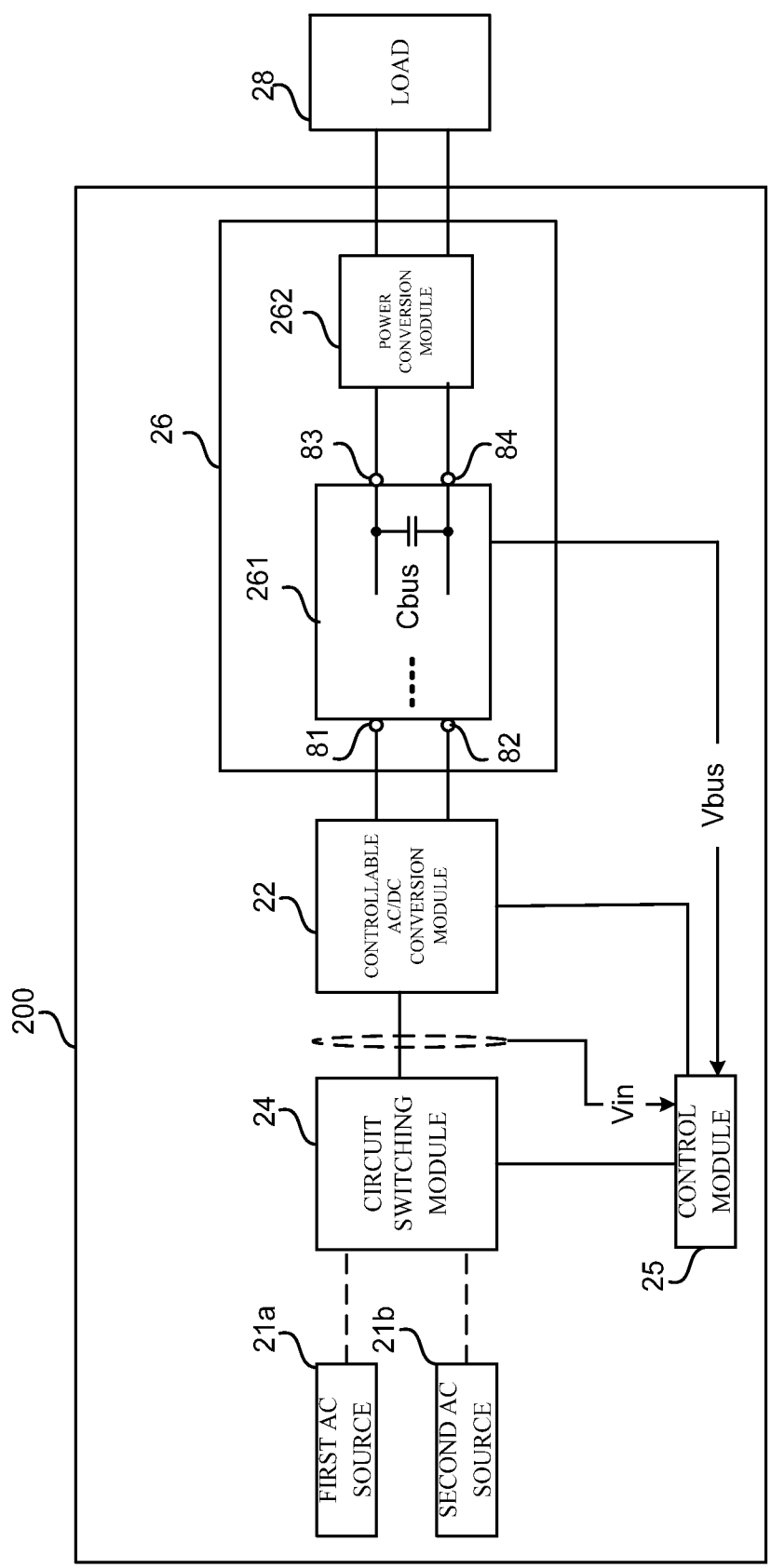
FIG. 3 illustratively depicts a circuit block diagram of a power supply system according to another embodiment of the present application.

FIG. 3 illustratively depicts a circuit block diagram of a power supply system according to another embodiment of the present application. In this power supply system, the subsequent stage power supply module 26 includes a Power Factor Correction (PFC) module 261 and a power conversion module 262.

The power conversion module 262 is configured to convert electrical energy output by the PFC module 261 and to supply electricity for the load 28. The power conversion module 262 may be a DC/DC conversion module, or may be a DC/AC conversion module.

The PFC module 261 is electrically coupled between the controllable AC/DC conversion module 22 and the power conversion module 262. Specifically, a first input terminal 81 and a second input terminal 82 of the PFC module 261 are electrically coupled to the controllable AC/DC conversion module 22, and a first output terminal 83 and a second output terminal 84 of the PFC module 261 are electrically coupled to the power conversion module 262. The PFC module 261 is configured to increase the power factor of the power supply system.

A bus capacitor Cbus may be included in the PFC module 261. The bus capacitor Cbus has two terminals electrically coupled to the first output terminal 83 and the second output terminal 84 of the PFC module 261 respectively and is arranged between the PFC module 261 and the power conversion module 262.

One of ordinary skill in this art will understand that, various structures may be arranged before the bus capacitor Cbus to achieve the effect of increasing the power factor, and thus detailed structures before the bus capacitor Cbus in the PFC module are not depicted specifically in FIG. 3.

In the power supply system depicted in FIG. 3, the two AC sources 21a and 21b output AC. During the switching process, if an instantaneous value of an input voltage Vin of the controllable AC/DC conversion module 22 is greater than the voltage Vbus across the bus capacitor Cbus in the PFC module 261 while the control module 25 is controlling the operation of the controllable AC/DC conversion module 22, there will be a possibility that the bus capacitor Cbus will be charged by the voltage Vin, and thus the devices in the circuit switching module 24, the controllable AC/DC conversion module 22 and the PFC module 261 may be damaged.

Thus, in order to realize a safe and reliable switching, the control module 25 may, when failure occurs in any one of the first AC source 21a and the second AC source 21b, firstly cut off the control signal for the controllable AC/DC conversion module 22, then control the circuit switching circuit 24 to switch to the other one of the first AC source 21a and the second 21b which is in normal operation, and then enable the control signal for the controllable AC/DC conversion module 22 (i.e., control the controllable AC/DC conversion module 22 to start operation) after a received instantaneous value of the input voltage Vin of the controllable AC/DC conversion module 22 is less than Vbus. In this way, a situation where large inrush currents are generated because of charging the bus capacitor Cbus in the subsequent stage power supply module by the voltage Vin at the moment when the control signal for the controllable AC/DC conversion module 22 is enabled, may be avoided.

Figure 4:
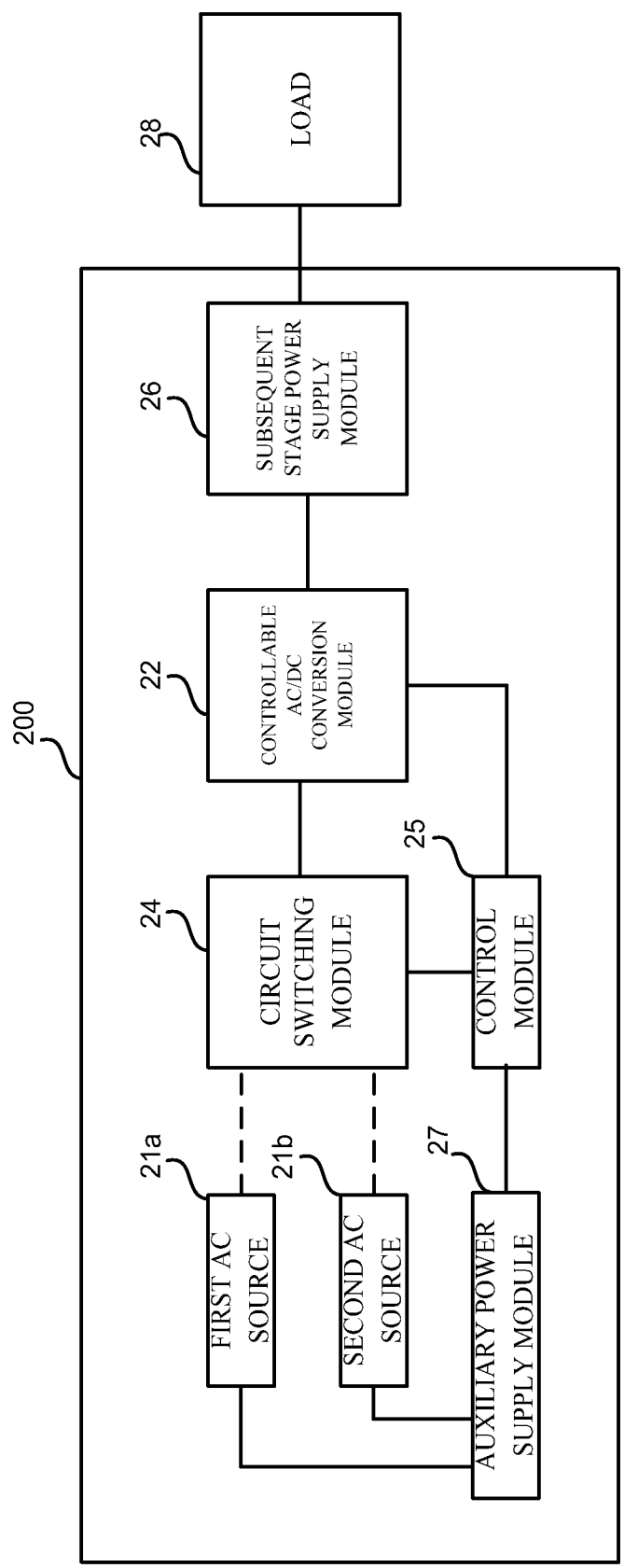
FIG. 4 illustratively depicts a circuit block diagram of a power supply system according to another embodiment of the present application.

FIG. 4 illustratively depicts a circuit block diagram of a power supply system according to another embodiment of the present application. As compared with the embodiment depicted in FIG. 2, the power supply system in this embodiment further includes an auxiliary power supply module 27, which is electrically coupled to the first AC source 21a, the second AC source 21b and the control module 25 and is configured to receive the AC output from the first AC source 21a and/or the second AC source 21b and to output an electrical signal required by the control module 25.

In the power supply system depicted in FIG. 4, the auxiliary power supply module 27 converts the AC from at least one of the first AC source 21a and the second AC source 21b into the electrical signal required by the control module 25. That is to say, whether in the start-up phase or the normal operation phase of the power supply system, normal electricity supplying to the control module may be guaranteed as long as one of the first AC source 21a and the second AC source 21b is in normal operation, and it is not needed to keep both of the first AC source 21a and the second AC source 21b in normal operation. In addition to supplying electricity to the control module 25, the auxiliary power supply module 27 may supply electricity to other modules in the power supply system. For example, electrical signals required by some circuit components in the circuit switching module 24 and the controllable AC/DC conversion module 22 when in normal operation may also be supplied by the auxiliary power supply module 27. It should be pointed out that, when the start-up of the power supply system is completed, some circuit components in the circuit switching module 24 and the controllable AC/DC conversion module 22 (e.g., relays in the circuit switching module 24, start-up relays and thyristors in the controllable AC/DC conversion module 22, etc.) may also be powered by the voltage across the bus capacitor Cbus, thereby increasing the stability and operation efficiency of the power supply system.

Of course, the auxiliary power supply module 27 depicted in FIG. 4 may also be applied to the power supply system depicted in FIG. 3.

Figure 5:
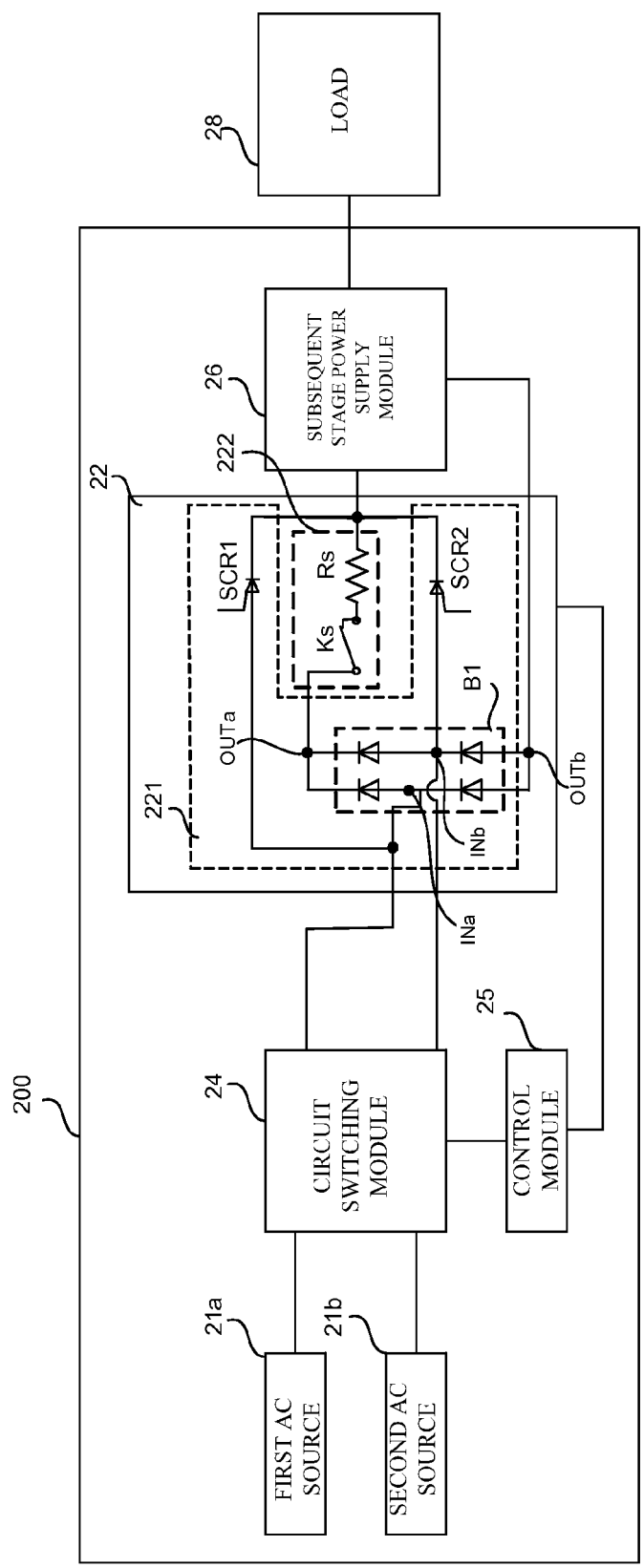
FIG. 5 illustratively depicts a circuit block diagram of a power supply system according to another embodiment of the present application.

FIG. 5 illustratively depicts a circuit block diagram of a power supply system according to another embodiment of the present application. In this embodiment, the controllable AC/DC conversion module 22 includes a controllable AC/DC conversion unit 221 and a soft start-up unit 222. The controllable AC/DC conversion unit 221 is electrically coupled to the circuit switching module 24, the control module 25 and the subsequent stage power supply module 26. The soft start-up unit 222 is electrically coupled to the controllable AC/DC conversion unit 221, the subsequent stage power supply module 26 and the control module 25 and is configured to suppress inrush currents when the power supply system 200 is started.

The soft start-up unit 222 may include a switching element Ks and an inrush suppressing resistor Rs. The switching element Ks is electrically coupled to the controllable AC/DC conversion unit 221 and the control module 25, and is turned on in the start-up phase of the power supply system and turned off after a normal start-up under the control of the control module 25. The inrush suppressing resistor Rs is electrically coupled between the switching element Ks and the subsequent stage power supply module 26. For example, the switching element Ks may be a start-up relay, one terminal of a main contact of the start-up relay is electrically coupled to the output terminal of the controllable AC/DC conversion unit 221, another terminal is electrically coupled to the inrush suppressing resistor Rs, and a control coil of the start-up relay is electrically coupled to and is controlled by the control module 25.

When the power supply system is started, the control module 25 controls the switching element Ks to be turned on, and the inrush currents in the power supply system may be suppressed by the function of the inrush suppressing resistor Rs, avoiding damages to the components in the power supply system due to the inrush currents and thereby ensuring the lifespan of the power supply system. After the completion of start-up, the control module 25 may control the switching element Ks to be turned off.

In the embodiment depicted in FIG. 5, the inrush suppressing resistor Rs is electrically coupled to the subsequent stage power supply module 26 directly, i.e., the inrush suppressing resistor Rs is arranged after the switching element Ks in the circuit block diagram. Alternatively, that the switching element Ks is arranged after the inrush suppressing resistor Rs is applicable.

Figure 6:
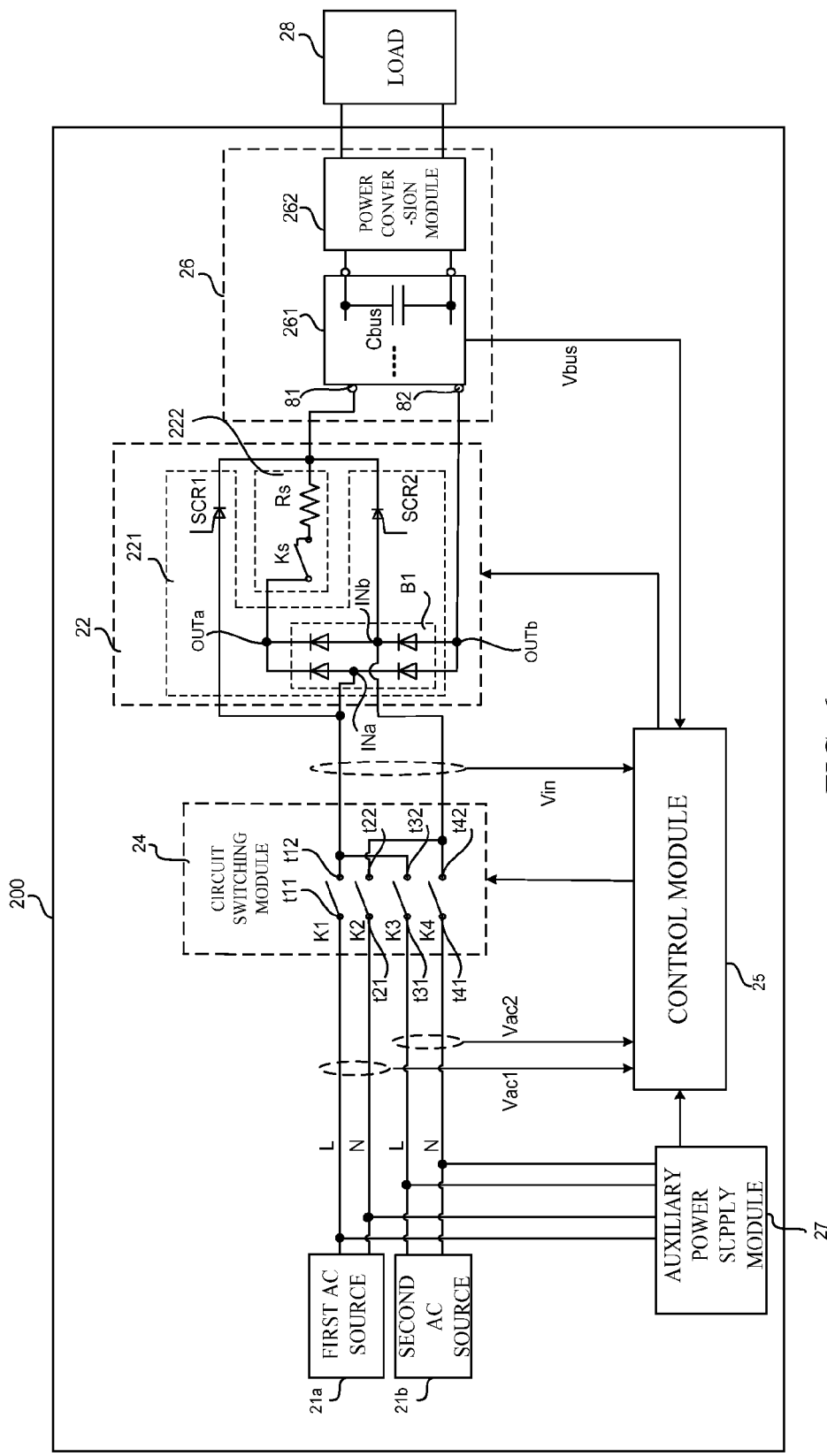
FIG. 6 illustratively depicts a circuit block diagram of a power supply system according to another embodiment of the present application.

For detailed structures of the controllable AC/DC conversion unit 221 depicted in FIG. 5, please refer to the following description with respect to FIG. 6.

It should be noted that, in the case where the controllable AC/DC conversion module 22 includes the controllable AC/DC conversion unit 221 and the soft start-up unit 222, the aforementioned expression "enable the control signal for the controllable AC/DC conversion module 22" specifically refers to enabling the control signal for the controllable AC/DC conversion unit 221.

FIG. 6 illustratively depicts a circuit block diagram of a power supply system according to another embodiment of the present application. In the embodiment, the controllable AC/DC conversion unit 221 includes a first thyristor SCR1, a second thyristor SCR2 and a bridge rectifier B1.

An anode of the first thyristor SCR1 is electrically coupled to the circuit switching module 24, and a cathode of the first thyristor SCR1 is electrically coupled to a first input terminal of the subsequent stage power supply module 26. Specifically, the first input terminal of the subsequent stage power supply module 26 may refer to the first input terminal 81 of the PFC module 261. An anode of the second thyristor SCR2 is electrically coupled to the circuit switching module 24, and a cathode of the thyristor SCR2 is electrically coupled to the first input terminal of the subsequent stage power supply module 26. Control terminals of the first thyristor SCR1 and the second thyristor SCR2 both receive the control signals output from the control module 25.

A first input terminal INa of the bridge rectifier B1 is electrically coupled to the circuit switching module 24 and the anode of the first thyristor SCR1, a second input terminal INb of the bridge rectifier B1 is electrically coupled to the circuit switching module 24 and the anode of the second thyristor SCR2, and a first output terminal OUTa of the bridge rectifier B1 is electrically coupled to a first terminal of the switching element Ks in the soft start-up unit 222. The switching element Ks may be, for example, a start-up relay. Specifically, the first output terminal OUTa of the bridge rectifier B1 is electrically coupled to a first terminal of the main contact switch of the start-up relay. A second terminal of the switching element Ks (e.g., a second terminal of the main contact switch of the start-up relay) is electrically coupled to one terminal of the inrush suppressing resistor Rs. A control terminal (e.g., a coil) of the start-up relay is electrically coupled to and is controlled by the control module 25. The other terminal of the inrush suppressing resistor Rs is electrically coupled to a common junction of the cathode of the first thyristor SCR1, the cathode of the second thyristor SCR2 and the first input terminal of the subsequent stage power supply module 26, and a second output terminal OUTb of the bridge rectifier B1 is electrically coupled to the second input terminal of the subsequent stage power supply module 26. Specifically, the second input terminal of the subsequent stage power supply module 26 may refer to the second input terminal 82 of the PFC module 261.

The circuit switching module 24 is electrically coupled to the first AC source 21a, the second AC source 21b, the controllable AC/DC conversion module 22 and the control module 25. When failure occurs in one of the first AC source 21a and the second AC source 21b, the control module 25 controls the circuit switching module 24 to switch to the other one of the first AC source 21a and the second AC source 21b which is in normal operation.

The circuit switching module 24 may include four switches, i.e., a first switch K1, a second switch K2, a third switch K3 and a fourth switch K4.

The four switches may be realized by one power relay. For example, the power relay may have four contact switches, among which two are normally open and the other two are normally closed.

Alternatively, the four switches may be realized by two power relays, each of which has two contact switches. The two contact switches of each relay both are normally open or both are normally closed, or one is normally open and the other one is normally closed.

Alternatively, the four switches may be realized by four power relays, each of which has one contact switch. Each of the contact switches may be normally open or normally closed.

The control module 25 controls the four switches to execute switching actions. For example, the control module 25 may control actions of respective switches by a coil of the power relay(s). For example, the coil may be electrically coupled to the control module 25.

A first terminal t11 of the first switch K1 is electrically coupled to a first output terminal (e.g., a live line (L)) of the first AC source 21a, and a second terminal t12 of the first switch K1 is electrically coupled to a first input terminal of the controllable AC/DC conversion module 22. The first input terminal of the controllable AC/DC conversion module 22 may refer to a common junction of the first input terminal INa of the bridge rectifier B1 and the anode of the first thyristor SCR1.

A first terminal t21 of the second switch K2 is electrically coupled to a second output terminal (e.g., a zero line (N)) of the first AC source 21a, and a second terminal t22 of the second switch K2 is electrically coupled to a second input terminal of the controllable AC/DC conversion module 22. The second input terminal of the controllable AC/DC conversion module 22 may refer to a common junction of the second input terminal INb of the bridge rectifier B1 and the anode of the second thyristor SCR2.

A first terminal t31 of the third switch K3 is electrically coupled to a first output terminal of the second AC source 21b, and a second terminal t32 of the third switch K3 is electrically coupled to the second terminal t12 of the first switch K1.

A first terminal t41 of the fourth switch K4 is electrically coupled to a second output terminal of the second AC source 21b, and a second terminal t42 of the fourth switch K4 is electrically coupled to the second terminal t22 of the second switch K2.

The controllable AC/DC conversion module 22 in FIG. 6 may also include the controllable AC/DC conversion unit 221 and the soft start-up unit 222. For specific structures and operation principles of the controllable AC/DC conversion unit 221 and the soft start-up unit 222, please refer to the aforementioned descriptions with reference to FIG. 5.

Operation principles of the power supply system depicted in FIG. 6 will be described below in detail.

Firstly, the working process when the power supply system is started will be described.

At first, the auxiliary power supply module 27 starts to operate to supply electricity to the control module 25, and may supply electricity to some circuit components in the circuit switching module 24 and the controllable AC/DC conversion module 22 of the power supply system 200, e.g., relays in the circuit switching module 24 and the start-up relays in the controllable AC/DC conversion module 22, etc.

When the input voltage of at least one AC source is normal, the control module 25 firstly cuts off control signals for the two thyristors SCR1 and SCR2 in the controllable AC/DC conversion unit 221, then closes the switching element Ks in the soft start-up unit 222, and then controls the circuit switching module 24 to switch to one AC source which is in normal operation after a certain time delay (this time delay may refer to the period of time required for the switching element Ks to completely close). If both of the two AC sources 21a and 21b are in normal operation, the AC source which is designated as a main AC source in advance (for example, the first AC source 21a) may be switched to. After a certain time delay (this time delay can guarantee reliable actions of the circuit switching module 24, i.e., a time delay which is required for the circuit switching module 24 to switch to one AC source being in normal operation), the control module 25 enables the control signals for the two thyristors SCR1 and SCR2 when the instantaneous value of Vin is less than Vbus. After a certain time delay (this time delay can guarantee reliable turn-on of the two thyristors SCR1 and SCR2), the control module 25 opens the switching element Ks. The power converter 262 in the subsequent stage power supply module 26 starts to operate after a certain time delay and may output energy to the load 28.

The switching element Ks and the inrush suppressing resistor Rs are connected in series to suppress inrush currents when the power supply system 200 is started. After completion of start-up (i.e., the circuit switching module 24 and the two thyristors SCR1 and SCR2 complete their actions), the switching element Ks is opened and will keep the open state throughout the subsequent normal operation of the power supply system 200.

Switching process when an AC source has a failure will be described below.

With the assumption that both of the AC sources 21a and 21b are capable of operating normally, the control module 25 controls the circuit switching module 24 to switch to the AC source which is designated as a main AC source in advance, e.g., the first AC source 21a. By detecting output voltages Vac1 and Vac2 of the two AC sources 21a and 21b, it can be determined whether the two AC sources have a failure. When failure occurs in the first AC source 21a (e.g., a power off), the control module 25 cuts off the control signals for the two thyristors SCR1 and SCR2. After a certain time delay (this time delay allows reliable turn-off of the two thyristors SCR1 and SCR2), the control module 25 controls the circuit switching module 24 to switch to the other one of the two AC sources which is being in normal operation, i.e., the second AC source 21b. The control module 25, after a certain time delay (this time delay allows reliable actions of respective relays in the circuit switching module 24), enables the control signals for the two thyristors SCR1 and SCR2 when the instantaneous value of Vin is less than Vbus. In this way, the switching from the first AC source 21a to the second AC source 21b may be completed, and the load 28 may be supplied with electricity by the second AC source 21b, thereby realizing an uninterrupted electricity supplying.

The power conversion module 262 needs a hold-up time period long enough to guarantee a stable and reliable output from the power supply system 200 during the switching process. For the power supply system provided by the present application, the longest time period for switching may be around 50 ms, and most of low-power power supply modules can realize a hold-up time period of 50 ms. Thus, various known power supply modules in the conventional technologies may be employed to realize the power conversion module 262, and detailed descriptions thereof are omitted herein.

In the above power supply system 200, the four switches K1, K2, K3 and K4 and the thyristors SCR1 and SCR2 are main components for realizing the switching of AC sources. Under control of the control module 25, the four switches K1, K2, K3 and K4 can be turned on and off in a zero current state, and the thryristors SCR1 and SCR2 can be turned on in a zero current state (the inherent characteristics of the thyristors guarantee that they may be turned off in a zero current state).

In the power supply system depicted in FIG. 6, the control module 25 controls the switching of respective switches K1, K2, K3 and K4 in the circuit switching module 24, controls the turn-on and turn-off of the start-up relay, the first thyristor SCR1 and the second thyristor SCR2 in the controllable AC/DC conversion module 22, and receives the voltage operation state signals of the two AC sources 21a and 21b, the instantaneous value of the input voltage Vin and the voltage value Vbus of the bus capacitor. It can be seen that, the control module 25, which controls action sequences of the circuit switching module 24 and the controllable AC/DC conversion module 22, is the core of control in the whole power supply system 200.

The control module 25 in respective embodiments of the present application may be various micro processors or micro controllers, in which programs written in a certain language may be stored. By executing these programs, the control module 25 may perform various controls as mentioned above. For example, the control module 25 may be a single chip microcomputer, in which programs written in assembly language may be stored, and the above control functions may be realized by executing these programs written in assembly language.

Figure 7:
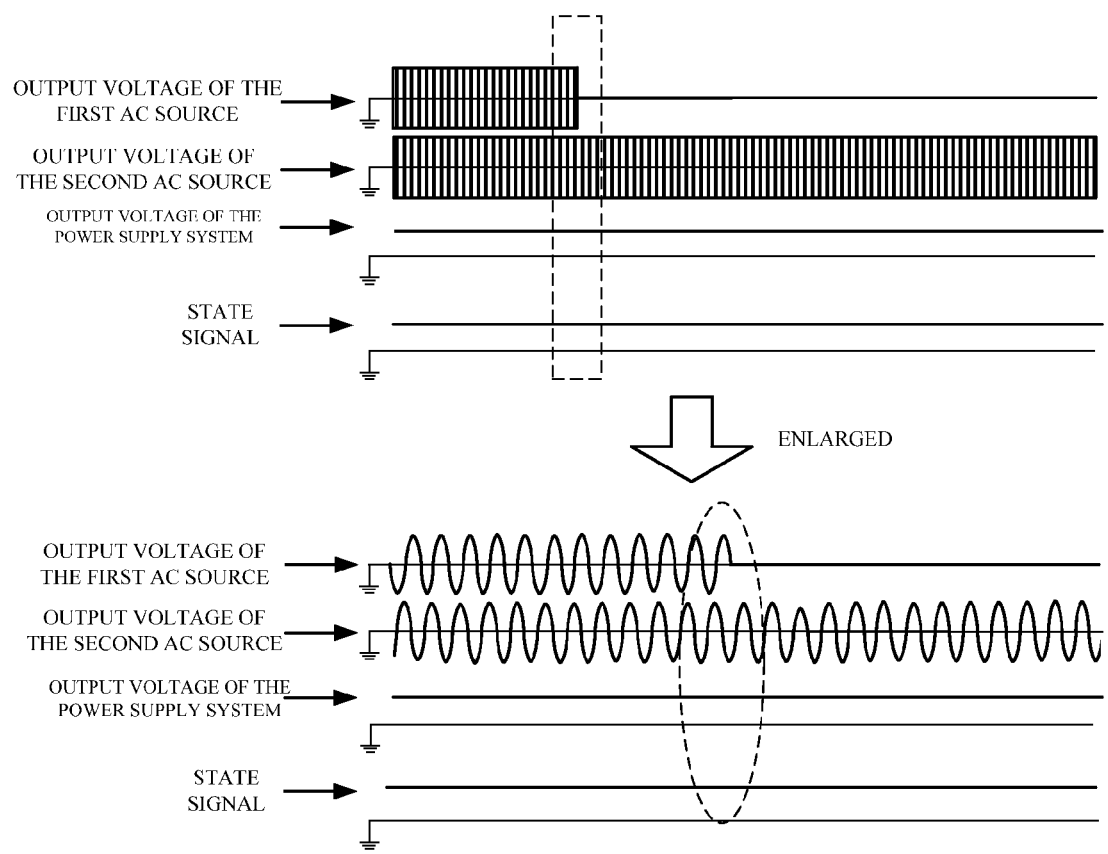
FIGS. 7 and 8 respectively depict illustrative voltage waveforms and current waveforms of the power supply system in FIG. 6 under a situation.
Figure 8:
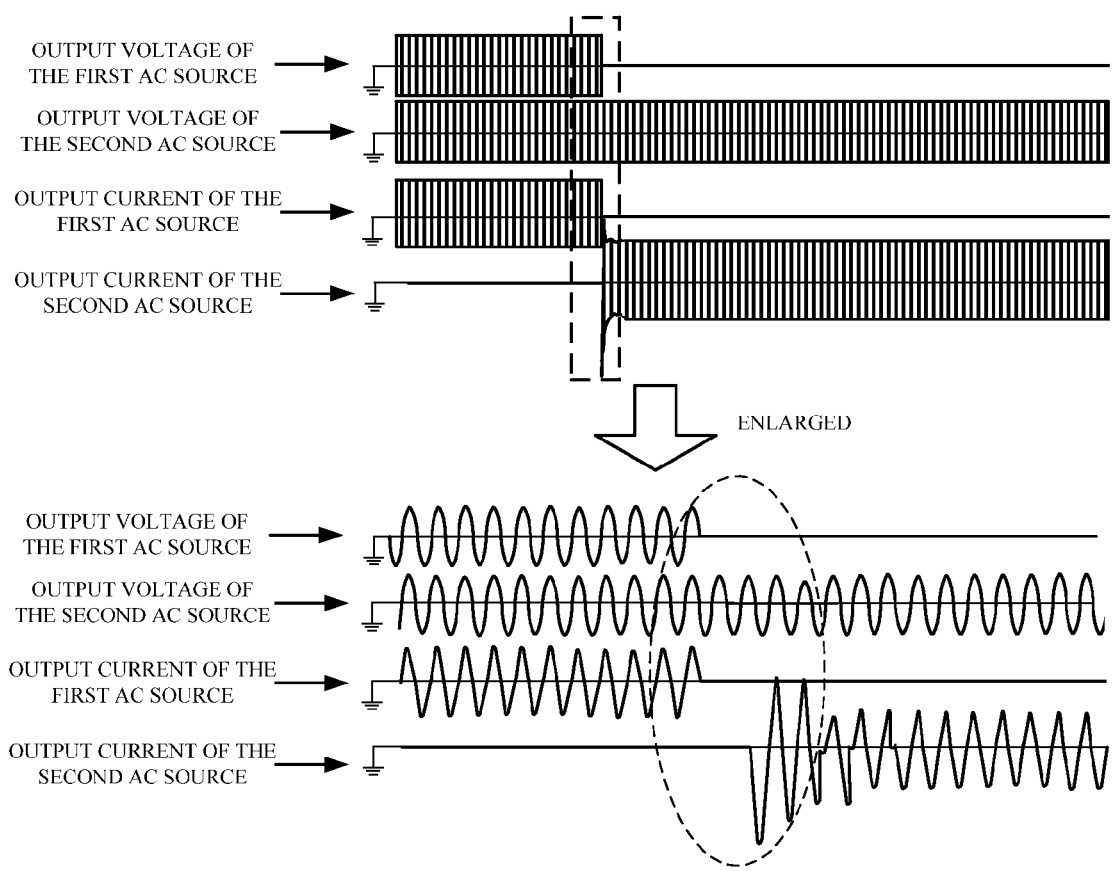

FIGS. 7 and 8 respectively depict illustrative voltage waveforms and current waveforms of the power supply system shown in FIG. 6 under a situation where the output voltages of the two AC sources are normal at first and then the first AC source has a power off. In FIGS. 7 and 8, the lower set of waveforms are enlarged waveforms of a portion of the upper set of waveforms framed by a broken-line box, wherein the state signal refers to a state signal of the output voltage of the power conversion module. It can be seen from the lower set of waveforms in FIGS. 7 and 8 (especially from the portion which is circled by a broken-line ellipse) that, after the output voltage of the first AC source is off, a smooth switching to the second AC source is realized, and the power supply system is not subject to any influence at all even in a full load operating situation.

Figure 9:
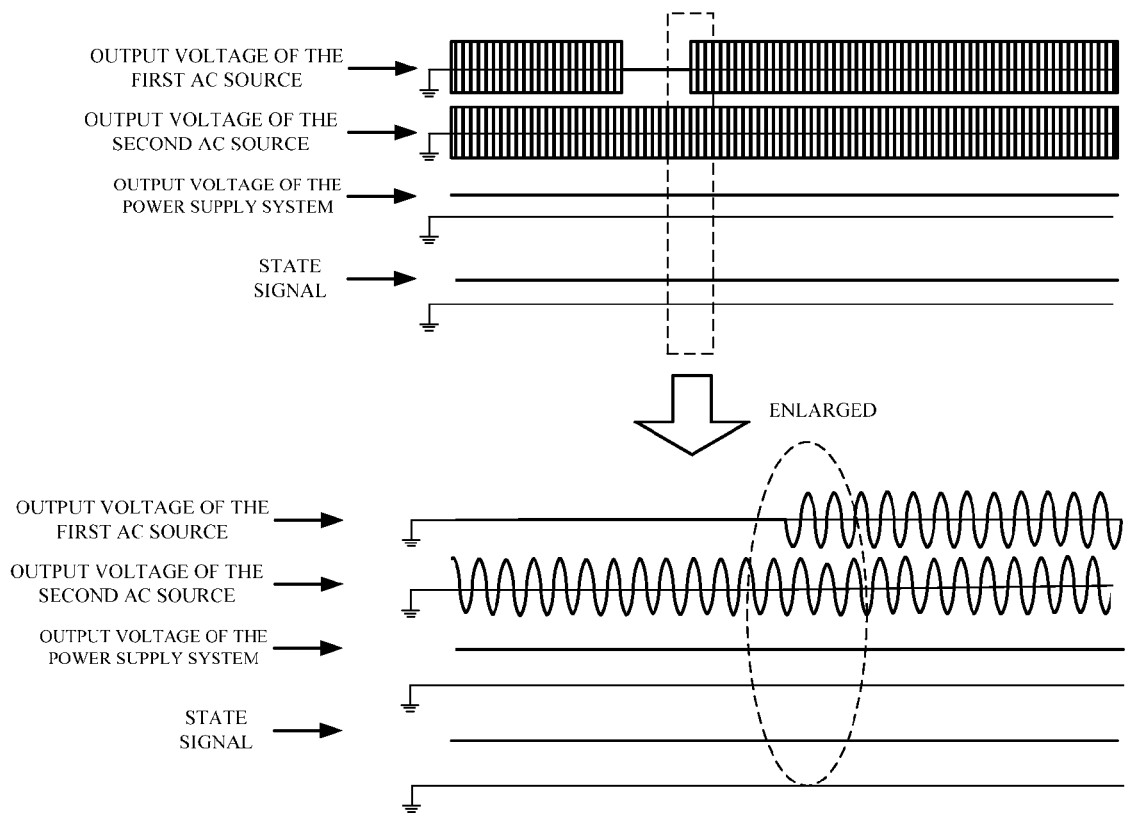
FIGS. 9 and 10 respectively depict illustrative voltage waveforms and current waveforms of the power supply system in FIG. 6 under another situation.
Figure 10:
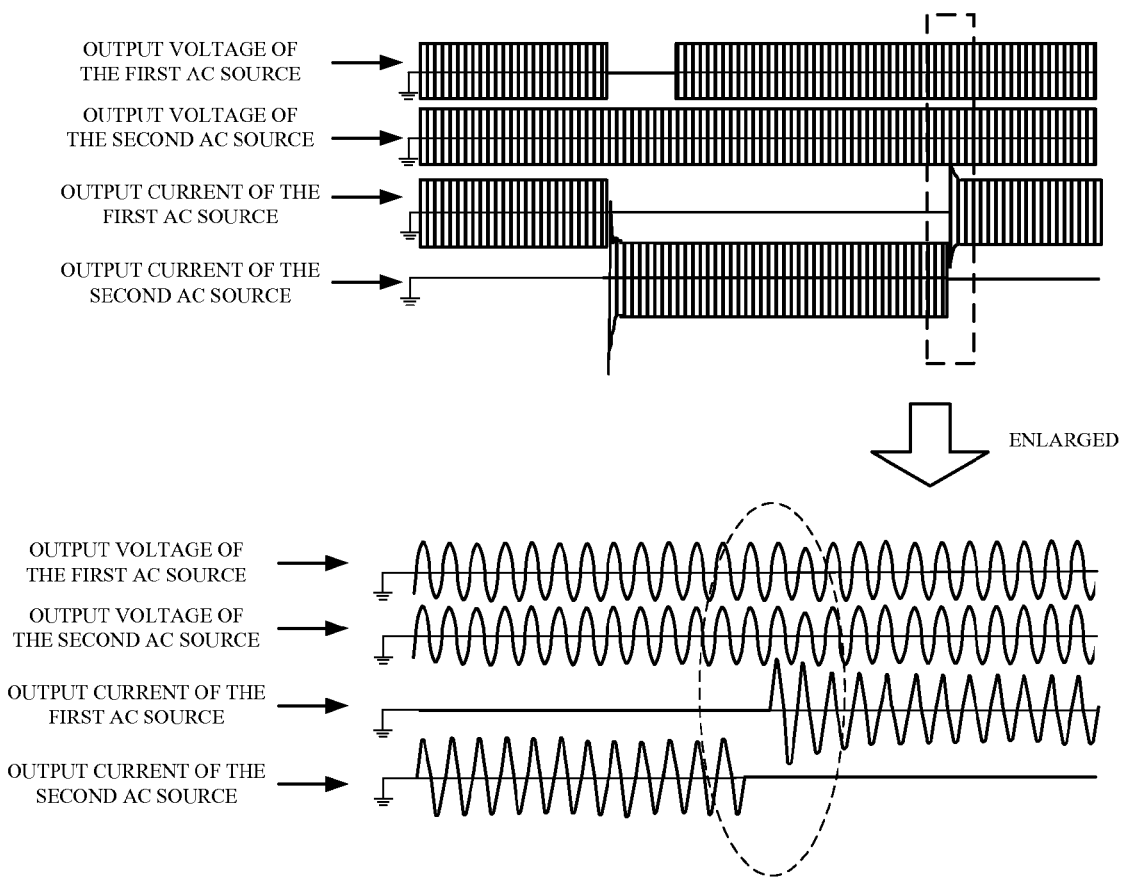

FIGS. 9 and 10 respectively depict illustrative voltage waveforms and current waveforms of the power supply system shown in FIG. 6 under another situation where the output voltage of the second AC source keeps normal all the time, while the output voltage of the first AC source changes from normal to off and then back to normal. In FIGS. 9 and 10, the process from power off to normal may be focused on, and the process from normal to power off may refer to FIGS. 7 and 8; the lower set of waveforms are enlarged waveforms of a portion of the upper set of waveforms framed by a broken-line box. It can be seen from the lower set of waveforms in FIGS. 9 and 10 (especially from the portion which is circled by a broken-line ellipse) that, the output of the power supply system is not subject to any influence at all even in a full load operating situation, and a smooth switching from the second AC source to the first AC source is realized.

Figure 11:
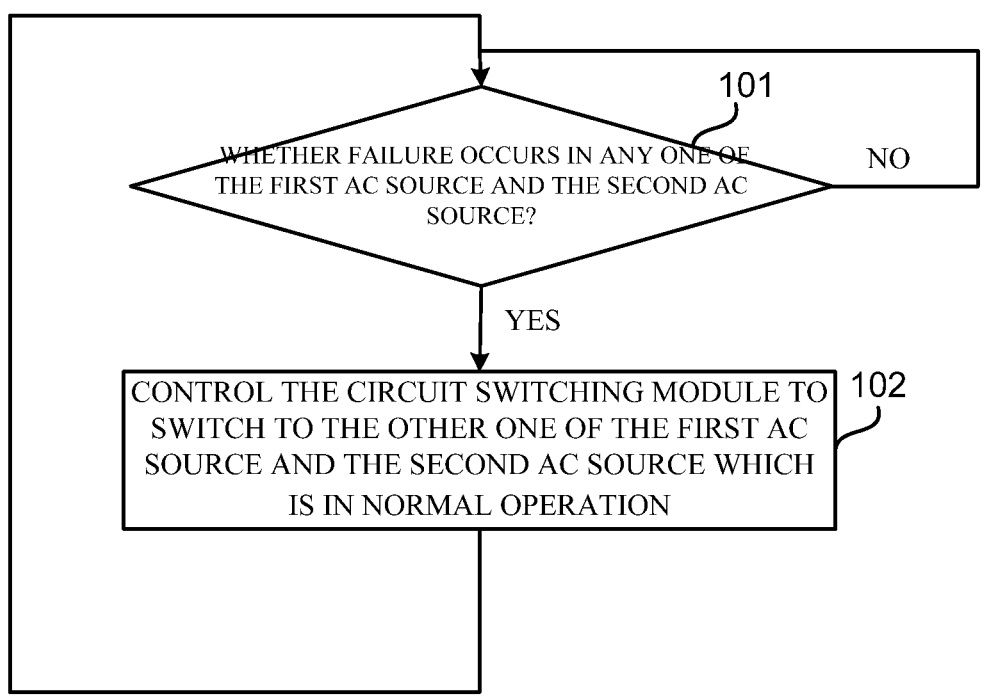
FIG. 11 illustratively depicts a flowchart of a method for controlling a power supply system according to an embodiment of the present application.

FIG. 11 illustratively depicts a flowchart of a method for controlling a power supply system according to an embodiment of the present application. The method includes the following steps.

At step 101, operation state signals of the first AC source and the second AC source are received, and it is judged whether there is an AC source having a failure. If failure occurs in any one AC source of the two AC sources, step 102 is performed; otherwise, if the judgment result is "NO", continue to perform step 101.

At step 102, the circuit switching module is controlled to switch to the other one of the first AC source and the second AC source which is in normal operation.

Specifically, step 102 may include: cutting off the control signal for the controllable AC/DC conversion module, and then controlling the circuit switching module to switch to the other one of the first AC source and the second AC source which is in normal operation, and then enabling the control signal for the controllable AC/DC conversion module.

After step 102, step 101 may be performed again.

Figure 12:
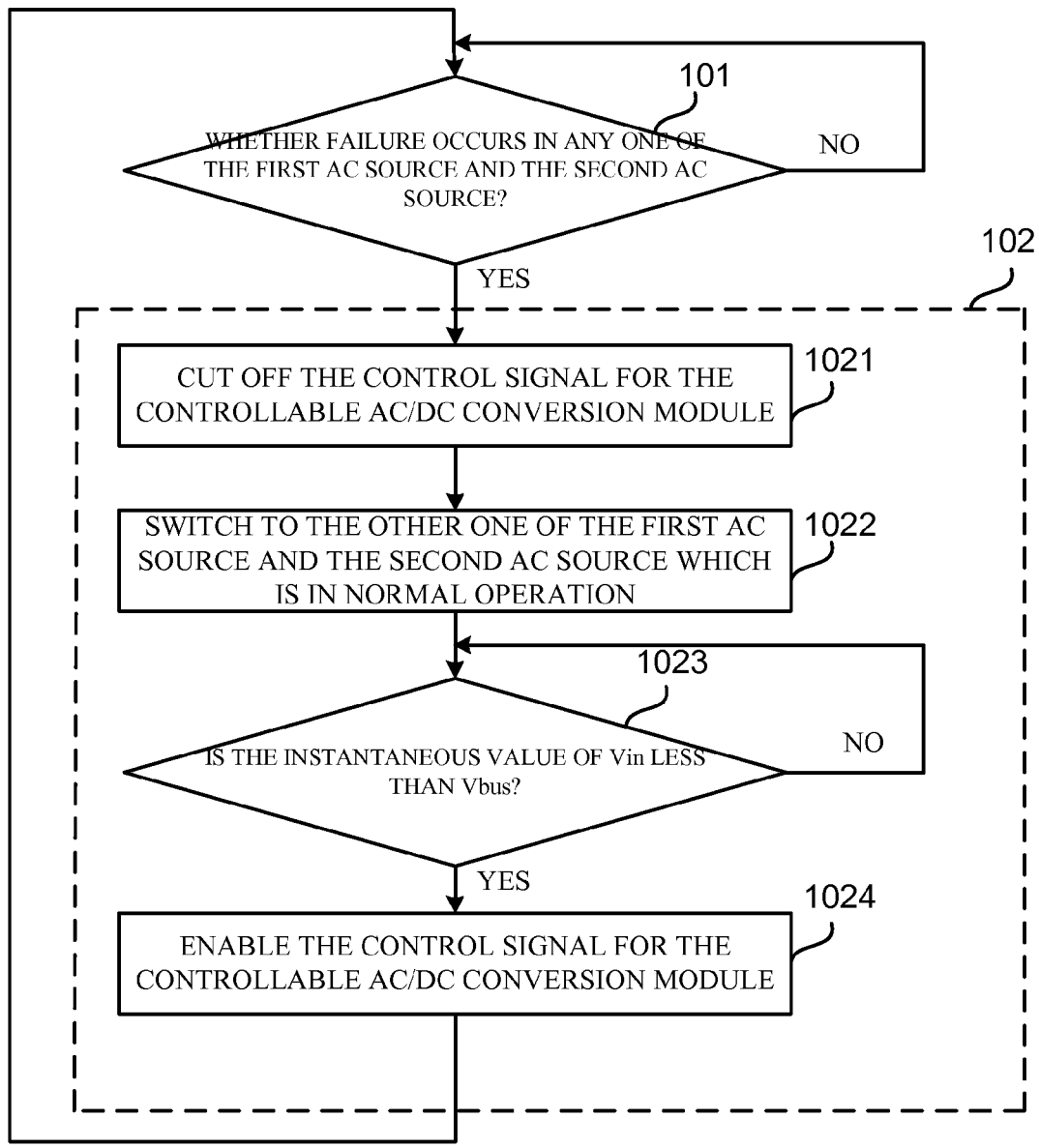
FIG. 12 illustratively depicts a flowchart of a method for controlling a power supply system according to another embodiment of the present application.

FIG. 12 illustratively depicts a flowchart of a method for controlling a power supply system according to another embodiment of the present application. In this embodiment, step 102 specifically includes the following steps.

At step 1021, the control signals for the controllable AC/DC conversion module are cut off by the control module. For example, under the situation shown in FIG. 6, the control signals for the two thyristors SCR1 and SCR2 depicted in FIG. 6 may be cut off.

At step 1022, the circuit switching module is controlled to switch to the other one of the first AC source and the second AC source which is in normal operation.

At step 1023, it is judged whether the instantaneous value of Vin is less than Vbus (Vbus is the value of the voltage across the bus capacitor Cbus). If the judgment result is "YES", step 1024 is performed. Otherwise, if the judgment result is "NO", step 1023 is repeated.

At step 1024, the control signal for the controllable AC/DC conversion module is enabled. For example, under the situation in FIG. 6, the control signals for the two thyristors SCR1 and SCR2 as depicted in FIG. 6 are enabled.

In the methods depicted in FIGS. 11 and 12, a start-up step may be included as well. Specifically, for the situation where the controllable AC/DC conversion module includes a controllable AC/DC conversion unit and a soft start-up unit, the aforementioned step of enabling the control signal for the controllable AC/DC conversion module may specifically refer to enabling the control signal for the controllable AC/DC conversion unit. When the power supply system is started, the control signal for the controllable AC/DC conversion unit is firstly cut off, the soft start-up unit is controlled to operate, and the circuit switching module is controlled to switch to any one of the first AC source and the second AC source which is in normal operation, then the control signal for the controllable AC/DC conversion unit is enabled, and then the soft start-up unit is controlled to stop operation.

More specifically, when the power supply system is started, the control signal for the controllable AC/DC conversion unit is cut off, the soft start-up unit is controlled to operate, the circuit switching module is controlled to switch to any one of the first AC source and the second AC source which is in normal operation, the instantaneous value of the input voltage of the controllable AC/DC conversion unit and the value of the voltage across the bus capacitor are received, and the control signal for the controllable AC/DC conversion unit is then enabled when the instantaneous value of the input voltage of the controllable AC/DC conversion unit is less than the value of the voltage across the bus capacitor.

In addition, before the power supply system is started, the auxiliary power supply module, which is electrically coupled to the first AC source, the second AC source and the control module respectively, receives AC electricity output from the first AC source and/or the second AC source, and outputs an electrical signal required by the control module. In this way, electricity supplying to the control module before the power supply system is started is realized.

For detailed control method of the power supply system in the present application, please refer to the above descriptions regarding the operation principles with reference to the structures of the power supply system, and descriptions thereof are omitted herein.

By employing the method for controlling the power supply in the present application, when switching, such a switching sequence as "cutting off the control signals for the thyristors→the circuit switching module performing switching→enabling the control signals for the thyristors" is followed, and thereby a fluent switching is realized. Furthermore, by selecting such timing when the instantaneous value of Vin is less than Vbus to enable the control signals for the thyristors, the fluency of the switching and thereby the lifespan of the power supply system are further guaranteed.

Although the present application has been described with reference to typical embodiments, it should be understood that the terminologies used herein are for illustration purposes rather than to limit the present application. The present application can be implemented in many specific forms without departing from the spirit and scope of the present application, and thus it would be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A power supply system, comprising:
    a first Alternating Current (AC) source and a second AC source;
    a circuit switching module;
    a controllable Alternating Current to Direct Current (AC/DC) conversion module electrically coupled to the circuit switching module and configured to convert AC output from the circuit switching module into DC;
    a subsequent stage power supply module electrically coupled to the controllable AC/DC conversion module and configured to convert the DC output from the controllable AC/DC conversion module into an electrical signal required by a load; and
    a control module electrically coupled to the circuit switching module and the controllable AC/DC conversion module and configured to receive operation state signals of the first AC source and the second AC source, and when failure occurs in any one of the first AC source and the second AC source, to control the circuit switching module to switch to the other one of the first AC source and the second AC source which is in normal operation,
    wherein the subsequent stage power supply module comprises a Power Factor Correction (PFC) module and a power conversion module, the PFC module being electrically coupled to the controllable A/C conversion module, a first output terminal and a second output terminal of the PFC module being electrically coupled to the power conversion module, and the power conversion module outputting the electrical signal required by the load,
    wherein the PFC module comprises a bus capacitor, which has two terminals electrically coupled to the first output terminal and the second output terminal of the PFC module respectively and which is arranged between the PFC module and the power conversion module, and
    wherein failure occurs in one of the first AC source and the second AC source, the control module is configured to cut off the control signal for the controllable AC/DC conversion module, then control the circuit switching module to switch to the other one of the first AC source and the second AC source which is in normal operation, receive an instantaneous value of an input voltage of the controllable AC/DC conversion module and a value of a voltage across the bus capacitor, and then enable the control signal for the controllable AC/DC conversion module when the instantaneous value of the input voltage of the controllable AC/DC conversion module is less than the value of the voltage across the bus capacitor.

2. The power supply system according to claim 1, further comprising an auxiliary power supply module electrically coupled to the first AC source, the second AC source and the control module respectively and configured to receive AC output from the first AC source and/or the second AC source and to output an electrical signal required by the control module.

3. The power supply system according to claim 1, wherein the circuit switching module comprises a first switch, a second switch, a third switch and a fourth switch, wherein:
    a first terminal of the first switch is electrically coupled to a first output terminal of the first AC source, and a second terminal of the first switch is electrically coupled to a first input terminal of the controllable AC/DC conversion module;

a first terminal of the second switch is electrically coupled to a second output terminal of the first AC source, and a second terminal of the second switch is electrically coupled to a second input terminal of the controllable AC/DC conversion module;

a first terminal of the third switch is electrically coupled to a first output terminal of the second AC source, and a second terminal of the third switch is electrically coupled to the second terminal of the first switch;

a first terminal of the fourth switch is electrically coupled to a second output terminal of the second AC source, and a second terminal of the fourth switch is electrically coupled to the second terminal of the second switch; and wherein the first switch, the second switch, the third switch and the fourth switch are under control of the control module.

4. The power supply system according to claim 1, wherein the controllable AC/DC conversion module comprises:

a controllable AC/DC conversion unit electrically coupled to the circuit switching module, the control module and the subsequent stage power supply module; and a soft start-up unit electrically coupled to the controllable AC/DC conversion unit, the control module and the subsequent stage power supply module and configured to suppress an inrush current when the power supply system is started.

5. The power supply system according to claim 4, wherein enabling the control signal for the controllable AC/DC conversion module refers to enabling a control signal for the controllable AC/DC conversion unit; and when the power supply system is started, the control module is configured to cut off the control signal for the controllable AC/DC conversion unit, control the soft start-up unit to operate and control the circuit switching module to switch to any one of the first AC source and the second AC source which is in normal operation, enable the control signal for the controllable AC/DC conversion unit and then control the soft start-up unit to stop operation.

6. The power supply system according to claim 5, wherein the controllable AC/DC conversion unit comprises a first thyristor, a second thyristor and a bridge rectifier;

an anode of the first thyristor is electrically coupled to the circuit switching module, a cathode of the first thyristor is electrically coupled to a first input terminal of the subsequent stage power supply module, and a control terminal of the first thyristor is electrically coupled to the control module;

an anode of the second thyristor is electrically coupled to the circuit switching module, a cathode of the second thyristor is electrically coupled to the first input terminal of the subsequent stage power supply module, and a control terminal of the second thyristor is electrically coupled to the control module; and a first input terminal of the bridge rectifier is electrically coupled to the circuit switching module and the anode of the first thyristor, a second input terminal of the bridge rectifier is electrically coupled to the circuit switching module and the anode of the second thyristor, a first output terminal of the bridge rectifier is electrically coupled to the first input terminal of the subsequent stage power supply module through the soft start-up unit, and a second output terminal of the bridge rectifier is electrically coupled to the second input terminal of the subsequent stage power supply module.

7. The power supply system according to claim 6, wherein the soft start-up unit comprises:

a switching element having a first terminal electrically coupled to the first output terminal of the bridge rectifier and being under control of the control module; and an inrush suppressing resistor having a terminal electrically coupled to a second terminal of the switching element and another terminal electrically coupled to a common junction of the first input terminal of the subsequent stage power supply module, the cathode of the first thyristor and the cathode of the second thyristor.

8. A method for controlling a power supply system, the power supply system comprising a first Alternating Current (AC) source, a second AC source, a control module, a circuit switching module and a subsequent stage power supply module, the method for controlling comprising:

receiving operation state signals of the first AC source and the second AC source, and when failure occurs in any one of the first AC source and the second AC source, controlling the circuit switching module to switch to the other one of the first AC source and the second AC source which is in normal operation, wherein the power supply system further comprises a controllable Alternating Current to Direct Current (AC/DC) conversion module, and the method for controlling further comprises:

when failure occurs in any one of the first AC source and the second AC source, cutting off a control signal for the controllable AC/DC conversion module, then controlling the circuit switching module to switch to the other one of the first AC source and the second AC source which is in normal operation, and then enabling the control signal for the controllable AC/DC conversion module, and wherein the subsequent stage power supply module is electrically coupled to the controllable AC/DC conversion module, the subsequent stage power supply module comprises a Power Factor Correction (PFC) module which comprises a bus capacitor, and the method for controlling further comprises:

controlling the circuit switching module to switch to the other one of the first AC source and the second AC source which is in normal operation, receiving an instantaneous value of an input voltage of the controllable AC/DC conversion module and a value of a voltage across the bus capacitor, and then enabling the control signal for the controllable AC/DC conversion module when the instantaneous value of the input voltage of the controllable AC/DC conversion module is less than the value of the voltage across the bus capacitor.

9. The method for controlling a power supply system according to claim 8, wherein the controllable AC/DC conversion module comprises a controllable AC/DC conversion unit and a soft start-up unit, enabling the control signal for the controllable AC/DC conversion module refers to enabling a control signal for the controllable AC/DC conversion unit, and the method for controlling further comprises:

when the power supply system is started, cutting off the control signal for the controllable AC/DC conversion unit, controlling the soft start-up unit to operate and controlling the circuit switching module to switch to any one of the first AC source and the second AC source which is in normal operation, enabling the control signal for the controllable AC/DC conversion unit, and controlling the soft start-up unit to stop operation.

10. The method for controlling a power supply system according to claim 9, wherein when the power supply system is started, cutting off the control signal for the controllable AC/DC conversion unit, controlling the soft start-up unit to operate, controlling the circuit switching module to switch to any one of the first AC source and the second AC source which is in normal operation, receiving the instantaneous value of the input voltage of the controllable AC/DC conversion unit and the value of the voltage across the bus capacitor, and enabling the control signal for the controllable AC/DC conversion unit when the instantaneous value of the input voltage of the controllable AC/DC conversion unit is less than the value of the voltage across the bus capacitor.

11. The method for controlling a power supply system according to claim 8, wherein when the power supply system is started, an auxiliary power supply module, which is electrically coupled to the first AC source, the second AC source and the control module respectively, receives AC output from the first AC source and/or the second AC source and outputs an electrical signal required by the control module.

* * * * *